3,313,186
METHOD OF AFFIXING A TUBE TO A
TOOL BODY
Rolland F. Rochon, Phillipston, Mass., assignor to UTD Corporation, Athol, Mass., a corporation of Massachusetts
Filed July 2, 1964, Ser. No. 379,923
2 Claims. (Cl. 76—108)

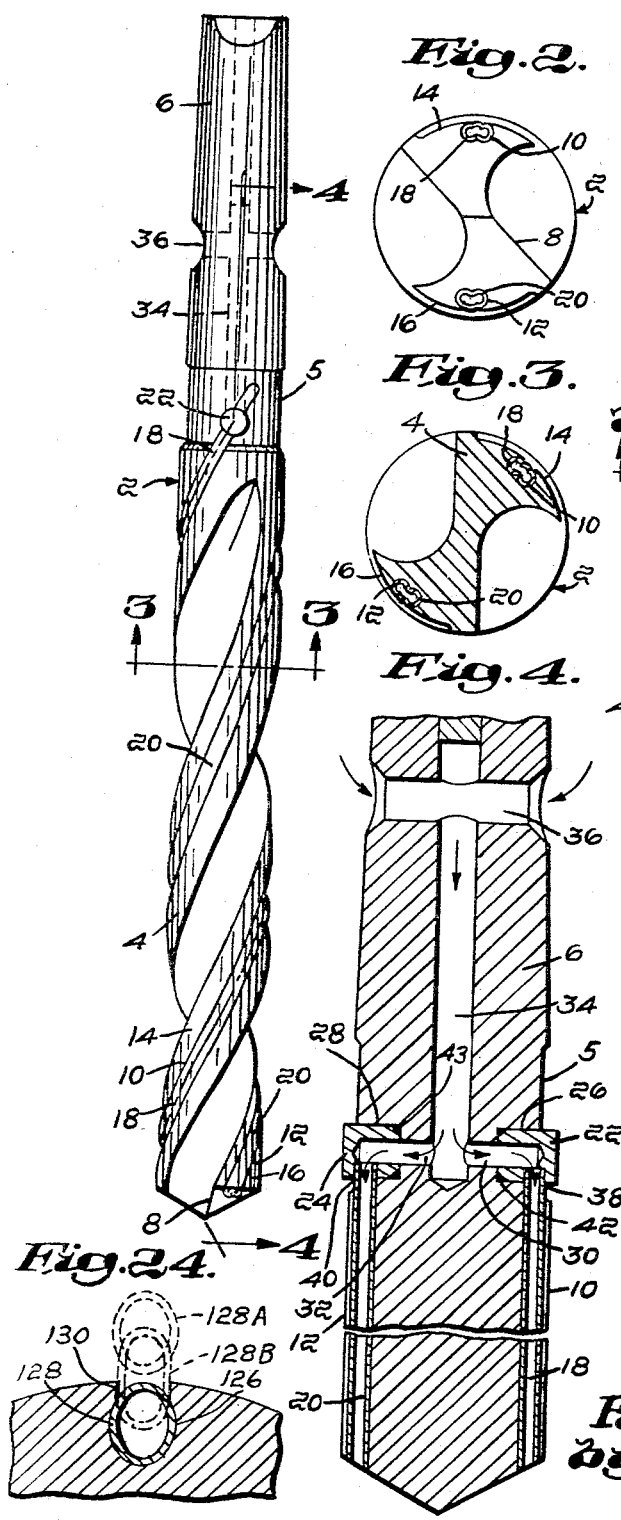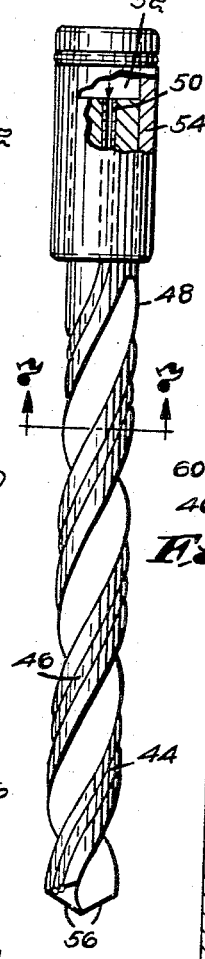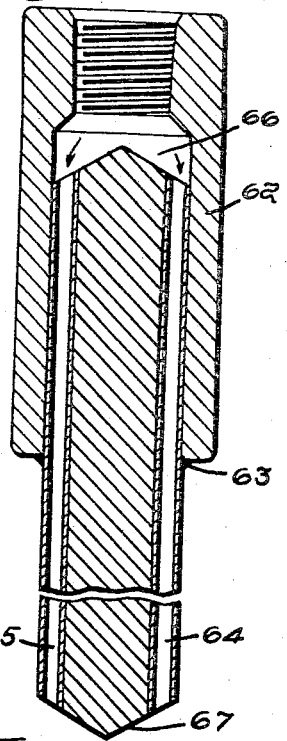

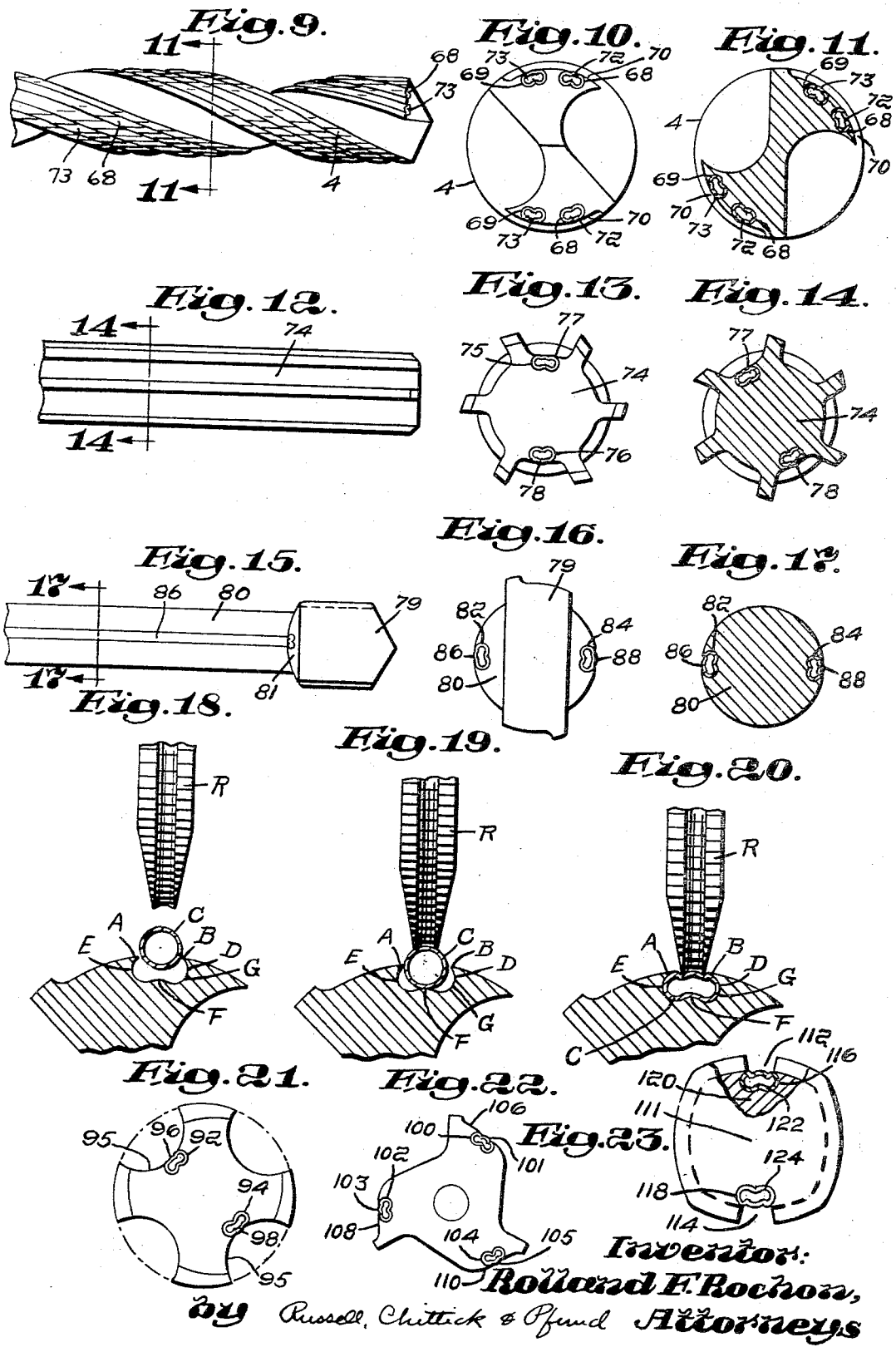

This invention relates to tools and is particularly concerned with cutting tools, such as, but not limited to, drills, reamers, counterbores, taps, thread formers, and the like. More particularly, it is concerned with that type of tool, such as, for example, a drill, in which the length in relation to the diameter is large and the cutting edge is functioning at a continually increasing distance from the point of introduction of the tool into the work.

In order to improve the efficiency and extend the life of such tools, it is necessary that a coolant and/or lubricant be fed to the cutting area. When the term "coolant" or "lubricant" is used hereinafter, it is to be understood that these words include liquid, gas, powder or other media capable of passing through a relatively small tube and which may be useful in improving the performance or increasing the life of the tools with which they are used. According to the earlier practice, the coolant had to be forced into the hole as the tool advanced, flowing downwardly along the flutes of the tool; but this had the disadvantage of opposing the outflow of chips.

Elongated tools have also been made in which small coolant-carrying holes have been drilled throughout the length of the tool body, but this construction has been difficult to make because of the tendency of the required small-diameter drill to wander as it travels through the long length of the tool body. This arrangement, however, in which the coolant holes extended through the length of the body of a tool was advantageous because the entering coolant was discharged in the area of cutting and then flowed upwardly and out through the flutes to assist in the removal of chips.

The prior art also discloses that tools of the character referred to herein have been made with separate coolant carrying tubes positioned in suitable grooves running the length of the tool. Difficulties, however, have been encountered in effecting proper fluid tight connection between the tubes and the source of coolant. Furthermore, the methods of securing the tubes in the grooves have either been difficult to perform or have resulted in inadequate anchorage, resulting in poor tool performance.

The present invention is concerned with the concept of providing a new and differently constructed tube for carrying coolant to the cutting area. This is done by cutting a small groove throughout the length of the body, land or flute of the tool involved and affixing therein in a novel manner a tube leading from a source of coolant and/or lubricant to the cutting area. If the tool is a drill, then the groove will be cut in the surface of the land; if a counterbore or tap, the groove may be cut in the bottom of the flute. The groove may be cut through the use of conventional tools such as milling cutters or grinding wheels, the only requirement being that the groove is undercut. The particular configuration of the undercutting is not critical, but, generally speaking, curved undercut side surfaces are preferred.

To facilitate the cutting of the groove, the operation is preferably done when the drill is in relatively soft annealed condition prior to final hardening and tempering. As a practical matter, those familiar with this art will recognize that, if the groove is created by milling, it should be done prior to hardening and tempering. Grinding the groove could be done after hardening, but this would be relatively slow and expensive.

According to the preferred construction, a length of tubing whose diameter will permit introduction of the tube into the groove is laid in the groove. The tube, when initially introduced and resting on the bottom of the groove, will extend above the adjacent surfaces. A roller is then utilized to run along the tube to apply substantial pressure thereto. This deforms the tube, causing it be spread laterally into the undercut areas of the groove, while at the same time the outer tube surface becomes approximately flush with the adjacent surface portions of the body.

Alternatively, the undercut groove might be filled by tubing which is, in its normal configuration, wider than the entrance width of the groove. The tubing could be inserted in the groove by compressing it laterally sufficiently to introduce it into the groove, but without going beyond the elastic limit of the tube. When in the groove, the tube would spring back to its normal shape, filling the undercut areas to lock the tube in the groove.

By various known means, a lubricant and/or coolant can be forced into the entrance end of the tube to flow therethrough and be delivered directly at the cutting area. In the case of a drill, there will preferably be one tube in each of the lands. However, if desired, particularly in large-sized drills, it might be considered desirable to have two or more tubes running side-by-side down each of the one or more lands of the drill. Hence it will be understood that the number of tubes running the length of the tool, whether in the body, land or flute, is a matter of choice, and it is intended that the recitation in the claims of a tube is intended to mean one or more tubes.

In the case of small straight-shank drills, the grooves and tubes preferably will extend the entire length of the body of the drill. The shank end of the drill is, in conventional manner, brazed into a larger surrounding shank (either cylindrical or tapered), with the shank ends of the tubes terminating within the larger surrounding shank. The brazing operation anchors the tubes against axial movement in the grooves. Thus a coolant forced into the shank enters the tubes and is delivered at the cutting end of the drill. In other cases, particularly in larger-sized drills with integral shanks (either straight or tapered), the grooves and tubes will terminate short of the drill holding socket, with the shank ends of the tubes connected by suitable means with coolant-carrying holes within the shank.

The distortion of the tubes as they are flattened to fill the undercut grooves in the lands or flutes is sufficient to preclude dislodgement of the tubes during normal operation of the tool. Sharpening of the cutting edge of a drill by grinding has no adverse effect on the tubes, as their discharge ends are gradually ground away along with adjacent parts of the drill. The discharge end of the tube cannot become blocked by the grinding operation, as the ground-away metal particles are far smaller than the cross-sectional area of the tube.

Another object of the invention is the provision of novel means for connecting the tubes with the coolant supply passages in those tools having integral shanks whereby the connection will be fluid-tight and substantially flush with the adjacent tool surface.

These and other objects of the invention will be more clearly understood as the description proceeds with the aid of the accompanying drawings in which:

FIG. 1 is a side elevation of a tapered-shank drill incorporating the invention;

FIG. 2 is an enlarged end view of FIG. 1 showing the terminal ends of the tubes;

FIG. 3 is an enlarged section taken on the line 3—3 of FIG. 1;

FIG. 4 is a sectional view taken on the line 4—4 of FIG. 1;

FIG. 5 is a side elevation of a straight-shank drill incorporating the invention, having its upper end secured in the socket of an enlarged shank;

FIG. 6 is an enlarged end view of FIG. 5 showing the delivery ends of the tubes;

FIG. 7 is an enlarged section taken on the line 7—7 of FIG. 5;

FIG. 8 is a longitudinal sectional view of a straight-shank drill and its associated enlarged shank which is internally threaded for connection with the coolant supply means. The flutes and lands of this drill may parallel the axis or may be helical as in FIGS. 1 and 5;

FIG. 9 is a side elevation of a portion of a drill showing a modified construction in which four tubes have been used, two in each land;

FIG. 10 is an enlarged view of the right end of FIG. 9;

FIG. 11 is an enlarged cross-section taken on the line 11—11 of FIG. 9;

FIG. 12 is a side elevation of a portion of a reamer having straight flutes;

FIG. 13 is an end view of the reamer of FIG. 12 showing the discharge ends of the tubes positioned in two of the flutes;

FIG. 14 is a section taken on the line 14—14 of a reamer similar to that of FIG. 12 but having helical flutes;

FIG. 15 illustrates a modification in which a short counterbore has been mounted on the end of a cylindrical shank showing the tubes terminating at the end of the shank;

FIG. 16 is a somewhat enlarged end view of FIG. 15 showing the terminal ends of the tubes carried by the shank;

FIG. 17 is a section on the line 17—17 of FIG. 15;

FIGS. 18, 19 and 20 show the steps in positioning an initially circular tube in the undercut groove in the land of a drill;

FIG. 21 is an end view of a tap in which coolant-carrying tubes are shown positioned in undercut grooves located in two of the flutes;

FIG. 22 is an end view of a counterbore showing three tubes, each positioned in one of the three lands;

FIG. 23 is an end view broken away in part of an internal thread former to which the present invention has been applied; and FIG. 24 shows another method of introducing a tube into the undercut groove.

The invention will now be more particularly described and explained by reference to examples shown in the drawings. In FIG. 1, there is shown a tapered-shank drill 2 having a body 4, a neck 5 and a tapered shank 6. Except insofar as the body and shank are modified by the present invention, the drill is of conventional construction and fully finished as to hardening and tempering.

Starting at the cutting lip 8 of the drill, it will be observed that there are two helical grooves 10 and 12 in the lands 14 and 16, which helical grooves extend the length of the body 4 and preferably terminate shortly after reaching the neck 5. In each of these helical grooves reside a tube, the tube 18 being in groove 10 and the tube 20 in groove 12. The lower discharge end of each of the tubes 18 and 20 is open and flush with the ground end of the drill adjacent lip 8. The shank end of tubes 18 and 20 are tightly, and preferably permanently, affixed in corresponding holes in the sides of plugs 22 and 24. These plugs reside in forced-fit relationship within corresponding holes 26 and 28 drilled 180° apart in the sides of the neck 5 and key the respective tubes 18 and 20 to the drill at these points. When there is movement between the tube and drill body due to the wind and unwind of the tool during use, the tube will not pull away from the shank holes 26 and 28 due to the keying action of the plugs. The interior central bores 30 and 32 of the plugs 22 and 24 lead through radially extending holes in the shank to an axially extending hole 34, which in turn connects with a transverse hole 36. When the tapered shank 6 is positioned in its conventional driving socket, a coolant under pressure can be supplied to passage 36, with the result that the coolant can flow through hole 34, outwardly through passages 30 and 32 and the plugs 22 and 24, and thence through tubes 18 and 20 to be discharged at the end of the drill adjacent the cutting lip.

Leakage at the plugs 22 and 24 is prevented by brazing or otherwise sealing the ends of tubes 18 and 20 into the plugs as at 38 and 40 and through the use of suitable seals, such as O-rings 42 and 43.

Attention is now called to FIGS. 2 and 3 showing the configuration of the grooves 10 and 12 in the lands 14 and 16 of the drill 2. These grooves are undercut so that the deformed tubes 18 and 20 therein may be securely held without the necessity of other attachment. The manner in which the tubes 18 and 20 are inserted in the undercut grooves and then deformed will be discussed later in connection with FIGS. 18, 19 and 20.

The exact cross-sectional configuration of the undercut grooves 10 and 12 is not critical but, generally speaking, it is preferred that the interior sides be curved so that the resulting deformation of the initially cylindrical tubing in filling the undercut area will not excessively reduce the available cross-sectional area of the tube through which the coolant flows. At the same time, however, the extent of the deformation must be sufficient to lock the tube in position.

In the construction shown in the various examples of the invention in which the coolant-carrying tubes are used with drills, it is preferred that the grooves be cut in the lands, as this facilitates the use of conventional groove-cutting equipment. It will be appreciated, of course, that the grooves could be cut elsewhere in the body of the drill as, for example, along the flute areas. This would, however, be considered less desirable because it would render more difficult the cutting of the grooves and the insertion and deformation of the tubes. However, as far as the structure set forth in the claims is concerned, it is to be understood that the tubes, while preferably located in the lands, may be helically disposed elsewhere in the drill body. Similar considerations are applicable with respect to reamers, counterbores, taps, thread formers, and the like, which are discussed hereinafter.

Turning now to FIGS. 5, 6, 7 and 8, it can be seen that the invention is equally applicable to a straight-shank drill. The principal difference of this construction over that shown in FIG. 1 is the means for bringing the supply of coolant to the entering ends of the tubes. As shown in FIG. 5, the tubes 44 and 46, after leaving the body 48 of the drill, may continue along the shank, either helically or parallel to the axis of the drill. In either case, the entering ends of the tubes as indicated at 50 are at the open space 52 within the confines of the outer end of the enlarged drill-receiving shank 54 which is brazed at 55 to the drill as well as to tubes 44 and 46. Shank 54, when attached to the drill driving mechanism, is adapted to receive coolant in the space 52 under pressure, which coolant then enters the receiving ends of tubes 44 and 46 to flow to the discharge ends adjacent the cutting lips 56. Since tubes 44 and 46 are positively affixed by brazing to the drill and shank, they cannot shift during use of the tool.

In this construction, as in that disclosed in FIG. 1, the tubes 44 and 46 have been deformed from their original configuration to fill undercut grooves 58 and 60 (see FIGS. 6 and 7). Here, as in the first case, the extent of the undercutting and deformation of the tubes is sufficient to prevent dislodgement of the tubes from the grooves during normal drilling operations.

The construction of FIG. 8 differs from that of FIGS. 5, 6 and 7 in that the drill has straight lands and flutes and the coolant tubes likewise are straight, following the straight lands. This alternative is included to show that the invention is capable of use with all types of drills. The enlarged shank 62 in this form, internally threaded at its entrance end for connection with the coolant supply, is brazed to the drill and tubes 64 and 65 at 63, thus keying the tubes securely in position to prevent movement in the grooves during use. The tubes 64 and 65 lead from the coolant-receiving area 66 to the cutting lip 67.

In some cases, it may be desirable to deliver greater quantities of coolant to the cutting areas. According to the present invention, this can be accomplished by enlarging the undercut groove and the tube positioned therein. To do this, however, might unduly weaken the drill body. An alternative solution is to utilize a plurality of smaller tubes in each of the lands of the drill body. Such arrangement is shown in FIGS. 9, 10 and 11. Here there are two undercut grooves 68 and 69 in each of the lands 70 in which are positioned two deformed tubes 72 and 73. Whether to use one tube in each land or a plurality of tubes is a matter of judgment and convenience.

FIGS. 12, 13 and 14 illustrate the manner in which the invention may be used with reamers. While FIG. 12 shows a reamer 74 with straight flutes, it will be understood that the invention may be used with equal facility with reamers having helical flutes.

As can be seen in FIGS. 13 and 14, the undercut grooves 75 and 76 are located at the bottom of the flutes. In these grooves the deformed tubes 77 and 78 are located, the tubes extending from the driving ends of the reamers, which can be in the form of tapered shanks as shown in FIG. 1 or enlarged cylindrical shanks such as those shown in FIGS. 5 and 8. In either case, coolant can be fed under pressure to the ends of the tubes 77 and 78 to be delivered at the bottom of the hole being reamed. The number and location of the coolant tubes is a matter of judgment and convenience.

FIGS. 15, 16 and 17 illustrate still another arrangement in which a counterbore 79 or other tool is of short length and has been affixed to the end of a shank 80. In such case, it may not be feasible to extend the undercut grooves beyond the end 81 of the shank. Thus, as shown in FIGS. 15 and 16, the grooves 82 and 84 and their related tubes 86 and 88 terminate at the end of the shank rather than at the end of the counterbore 79. However, the coolant leaving the tubes 86 and 88 will immediately reach the cutting areas, so for all practical purposes this is fully as effective in delivering coolant to the place required. The invention, however, again is the same in that the grooves in the shank 80 are undercut and the coolant-carrying tubes 86 and 88 are deformed therein.

FIGS. 21, 22 and 23 show the equal applicability of the invention to taps, other types of counterbores and internal thread formers. In FIG. 21, the undercut grooves 92 and 94 are located at the bottom of the tap flutes (straight or helical) and in these grooves are the deformed tubes 96 and 98.

In FIG. 22, the undercut grooves 100, 102 and 104 and deformed tubes 101, 103 and 105 are located in the lands 106, 108 and 110 (straight or helical) as distinguished from being located in the flutes of the reamer shown in FIGS. 12, 13 and 14.

In FIG. 23 is shown an end view of an internal thread former 111, a tool which forms internal threads without producing chips. By first cutting the threads away as at 112 and 114, the tube receiving grooves 116 and 118 may be cut into the body 120 of the thread former, after which the coolant tubes 122 and 124 may be inserted and deformed to be secured therein.

Reference will now be made to FIGS. 18, 19 and 20 showing the method of inserting a tube in an undercut groove and then deforming the tube in such manner that it becomes securely and permanently locked in the groove. This procedure is applicable to all of the various tools disclosed herein.

As can be seen in FIG. 18, the width of the undercut groove G between points A and B is only slightly greater than the diameter of tube C. The undercut areas indicated at D and E and extending throughout the length of the groove G have been produced by known mechanisms. In the preferred construction, the depth of the groove to the point F is less than the diameter of tube C. Thus the tube C may be initially positioned by hand or by machine within the groove as suggested in FIG. 19. Then when in this position, a roll R is rolled along the tube, exerting sufficient force on the tube to deform it beyond the tube's elastic limit so that the tube C assumes a configuration approximately that shown in FIG. 20. Once in this position, it is impossible for the tube to escape from the groove under normal conditions of tool use. Regardless of the particular relationship of groove width, depth and undercutting to the tube cross-sectional form when using the tube deformation method, it must be possible to place the tube in the groove and then deform it so that it enters sufficiently into the undercut areas to prevent escape therefrom during normal tool use.

The alternative method of squeezing the tube laterally to get it into the groove (as illustrated in FIG. 24) and then allowing it to expand into the undercut areas might be preferred when using very flexible or thin-walled tubing which could be deformed to the extent required without exceeding the elastic limit. Tubing other than metal might be used in this connection provided it could meet the temperature conditions prevailing during the use of the tool.

Referring to FIG. 24, the groove 126 is undercut in a manner adapted to receive an oval tube 128, for example. Tube 128 shown is dotted lines at 128A prior to insertion in groove 126 may be introduced into the groove by squeezing it laterally to the shape suggested at 128B in which its width is reduced enough to pass through the entrance 130. Since the elastic limit has not been exceeded, the tube will resume its original shape when in groove 126, thereby locking itself in position.

In the form shown in FIGS. 1 to 4, the upper end of each tube which has previously been connected with its respective plug as shown in FIG. 4 is, of course, not rolled because the tube end at the point of connection with the plug should remain cylindrical. However, since the plugs 22 and 24 are in forced-fit engagement with their respective holes in the neck 5, the upper ends of the tubes cannot escape from the grooves.

It is to be understood in connection with the following claims that the inventive concept is aimed more particularly at the manner in which the coolant-conveying tube is secured to the elongated tool, whatever that tool may be, and whether by permanent deformation or by compression and release. Likewise, the undercut groove or grooves may be located in any portion of the body of the tool where it is expedient to place it; that is, the groove or grooves may follow the lands or the flutes or, in the case of a cylindrical shank carrying a tool, may merely follow the outer periphery either helically or parallel to the axis. The extent of the deformation of the tube as in FIG. 20 or its expanded position as in FIG. 24 will in most cases be sufficient to place the outer surface of the tube approximately at or just below the adjacent surfaces of the body (land or flute) so that wear on the outer surface of the tube as the tool rotates will be avoided.

The material of which the tube is made may be of any found suitable for the purpose. In the preferred form, in which the tube is deformed, it has been determined that stainless steel tubes are satisfactory in that they can withstand the heat generated during the various operations to which the tools are subsequently put, such as drilling, reaming and tapping, etc. and can at the same time be deformed beyond their elastic limit to the extent required without danger of cracking. Again, the selection of tube diameters and wall thickness, groove depths and undercut configurations are all matters of choice within the limits of the material used so long as the tube, when laterally expanded within the groove, will remain secure therein during all conditions of use.

It is intended to cover all changes and modifications of the examples of the invention herein chosen for purposes of the disclosure which do not constitute departures from the spirit and scope of the invention.

I claim:

1. The method of permanently affixing a tube to an elongated tool body comprising the steps of forming an elongated groove with at least two opposed undercut surfaces along substantially the entire length of said body, loosely laying a tube in said groove, and thereafter permanently deforming the wall of said tube to bring said wall into tight engagement with said opposed undercut surfaces.

2. The method of permanently affixing a tube to an elongated tool body, as set forth in claim 1, and comprising the additional step of securing the shank end of said tube to the tool body to preclude axial movement of said tube in said groove.

References Cited by the Examiner

UNITED STATES PATENTS

| | | | |
|---|---|---|---|
| 288,957 | 11/1883 | Soderstrom | 77—68 |
| 580,398 | 4/1897 | Hoenscheid | 77—68 |
| 1,379,995 | 5/1921 | Kunzer | 76—108 |
| 2,290,933 | 7/1942 | Andreasson | 76—108 |
| 2,319,544 | 5/1943 | Harley et al. | 10—141 |
| 2,469,543 | 5/1949 | Bondhus | 77—58 |
| 2,485,077 | 10/1949 | Benschoten | 77—58 |
| 3,037,264 | 5/1962 | Mossberg | 29—106 |
| 3,096,668 | 7/1963 | Maynard | 77—68 |
| 3,113,330 | 12/1963 | King et al. | 10—141 |
| 3,147,536 | 9/1964 | Lamphere | 29—106 |
| 3,182,531 | 5/1965 | Moore et al. | 77—72 |
| 3,199,382 | 8/1965 | Andreasson | 77—72 |

FOREIGN PATENTS

| | | |
|---|---|---|
| 854,545 | 1/1940 | France. |
| 524,519 | 5/1931 | Germany. |
| 355,631 | 8/1931 | Great Britain. |

FRANCIS S. HUSAR, *Primary Examiner.*